United States Patent [19]

Keller

[11] 4,166,955

[45] Sep. 4, 1979

[54] RADIATION DETECTOR AND METHOD OF OPERATING THE SAME

[75] Inventor: Hansjürg Keller, Männedorf, Switzerland

[73] Assignee: Cerberus AG, Männedorf, Switzerland

[21] Appl. No.: 891,902

[22] Filed: Mar. 30, 1978

[30] Foreign Application Priority Data

Jun. 24, 1977 [CH] Switzerland ............... 7760/77

[51] Int. Cl.$^2$ .................................. G01J 1/00
[52] U.S. Cl. ............................ 250/342; 250/349
[58] Field of Search ............. 250/349, 338, 372, 342, 250/385; 340/567, 628, 630, 577, 578, 587

[56] References Cited

U.S. PATENT DOCUMENTS

| | | | |
|---|---|---|---|
| 3,848,129 | 11/1974 | Figler et al. | 250/342 |
| 3,931,515 | 1/1976 | Parkin | 250/338 |

Primary Examiner—Davis L. Willis
Assistant Examiner—Carolyn E. Fields
Attorney, Agent, or Firm—Werner W. Kleeman

[57] ABSTRACT

A radiation detector having at least one radiation sensitive element with more than two electrical contacts. The effects of noise occurring between pairs of contacts are substantially eliminated by multiplying at least two partial signals appearing between two of the contacts. The detector is particularly suitable for use as a passive infrared detector and as a flame detector.

19 Claims, 10 Drawing Figures

RADIATION DETECTOR AND METHOD OF OPERATING THE SAME

BACKGROUND OF THE INVENTION

The present invention relates to a new and improved construction of radiation detector which is of the type embodying at least one radiation sensitive element which delivers an electrical signal in accordance with the electromagnetic radiation impinging thereat, and this invention also relates to a new and improved method of operating such radiation detector.

Such radiation detectors serve for the conversion of electromagnetic radiation in the optical, infrared or ultraviolet range into electrical signals. This conversion can be accomplished in different ways, for instance by means of the internal photoelectric effect of semiconductor materials of photoresistors, photodiodes, photoelements or phototransistors, or by the secondary effect of the heat which is formed due to the absorbed radiation in the element, wherein there can be then used for the transducing or conversion of the heat into an electrical signal, for instance the resistance change of a thermistor or the charge displacements in a polarized, pyroelectric crystal or plastic. Such radiation detectors are known in numerous constructions and are extensively used.

A drawback of such state-of-the-art radiation detectors is that a noise signal is superimposed upon the electrical output signal, this noise signal placing a lower limit upon the radiation detection. This noise signal is particularly then detremental when the radiation signal which is to be detected has a similar course, for instance if individual radiation pulses are to be detected at a certain spacing from one another which cannot be distinguished from the noise signal. When using such radiation detectors in passive infrared radiation-burglary detectors or in optical flame detectors, it is therefore possible for there to be simulated by the unavoidable noise signal an alarm signal, although in fact there is no real cause for an alarm. The sensitivity of such equipment therefore cannot be improved without limits, rather must be chosen such that there is only detected radiation which is appreciably more intensive than the noise signal.

In order to avoid this drawback it has already been proposed to employ two separate, but similar radiation detectors with separate amplifiers and threshold value switches, which are connected such that an ouput signal only then appears when both channels simultaneously carry a signal. The operation of this system is predicated upon the assumption that the probability that both channels will simultaneously deliver an identical noise signal is extremely small. What is disadvantageous with this equipment is that both radiation detectors do not always receive the same radiation, i.e., their output signals can have a slightly different course. Therefore, it can happen that with such combibination of two separate radiation detectors, while it is possible to extensively suppress false alarms, nonetheless on the other hand in certain cases it can happen that no output signal is transmitted notwithstanding the presence of a cause for alarm. Apart from this disadvantage it is further to be appreciated that with such combination of two radiation detectors the entire circuit expenditure is more than doubled, something which is totally unacceptable for certain fields of application.

SUMMARY OF THE INVENTION

Hence, with the foregoing in mind it is a primary object of the present invention to provide a new and improved construction of radiation detector and method of operating the same which is not associated with the aforementioned drawbacks and limitations of the prior art proposals.

Another and more specific object of the present invention aims at eliminating the aforementioned drawbacks and providing a radiation detector wherein the effect of the noise signal is extensively eliminated, without impairing the detection security of the detector and without appreciably increasing the circuit expenditure and the number of components, while increasing the detection sensitivity.

Still a further object of the invention and in keeping with the aforementioned objective resides in providing such radiation detector so that it is particularly suitable for use as a passive infrared detector for the detection of the radiation of a person, for instance a burglar or intruder, moving within a protected room or area, or for use in a fire alarm for the detection of the radiation of burning objects or flames.

Yet a further significant object of the present invention is concerned with an improved radiation detector which is relatively simple in construction and design, extremely reliable in operation, possesses enhanced detection sensitivity, requires a minimum of servicing and maintenance, and is not readily subject to malfunction or breakdown.

Now in order to implement these and still further objects of the invention, which will become more readily apparent as the description proceeds, the invention contemplates that each radiation sensitive element possesses more than two electrical contacts, and that there is provided a device for the multiplication of at least two partial signals, which if desired can be amplified, appearing in each case between two of the contacts. Amplification can be linear or also non-linear.

The invention exploits the fact that by virtue of the multiplication of the partial signals in each case between two detector element-contacts or connections the resultant product $A = T_1 \cdot T_2 \cdot \ldots \cdot T_n$ only then differs from null when all of the partial signals are different from null, i.e., when the noise pulses in the individual partial signals occur exactly at the same time. This probability is however extremely small. If, however, the detector is uniformly impinged with radiation, then all of the partial signals will simultaneously differ from null, and thus, also the output signal.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
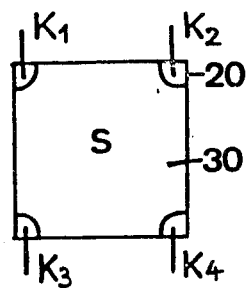
FIGS. 1 to 7 respectively show different constructions of flat detector elements and illustrating four different possibilities of arranging the contacts.

Describing now the drawings, wherein there have been generally used throughout the various Figures showing different embodiments of the invention the same reference characters for the same or analogous components, in FIG. 1 there is shown an example of a possible arrangement of contacts or connections $K_1$, $K_2$, $K_3$, $K_4$ at a substantially flat, radiation sensitive detector element S, for instance in the form of a thin plate 30 formed of photoconductive or heat sensitive material. At the four corners of the quadratic or square plate 30 of the detector S there are mounted small metallic surfaces 20 providing the contacts $K_1$, $K_2$, $K_3$, $K_4$ and between which surfaces 20 there is disposed the radiation sensitive material of the detector element S.

Figure 9:
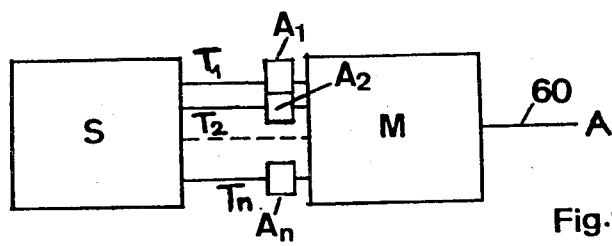
FIG. 9 is a block circuit diagram of a radiation detector constructed according to the present invention.

The contacts or connections of the detector element S, as shown in FIG. 9, lead to a mulitiplication device or multiplier M, which if desired after suitable amplification of the partial signals at the amplifiers $A_1, A_2 \ldots A_n$, forms the product of the partial signals between certain combinations of two respective contacts $K_1 \ldots K_n$, as will be explained in greater detail hereinafter. It can be advantageous not to employ all possible combinations or partial signals for evaluation, rather only those whose noise signals are as extensively independent from one another as possible. Thus, for instance, with the contact arrangement of FIG. 1 there can be employed both of the partial signals $T_1$ ($K_1$, $K_4$) and $T_2$ ($K_2$, $K_3$). In this respect it is of advantage if the radiation which is to be detected influences both of the partial signals $T_1$ and $T_2$ almost in the same manner, whereas the noise signal is different. Instead of this, it is however possible to evaluate by means of the multiplier M also both of the signals $T_3$ ($K_1$, $K_2$) and $T_4$ ($K_3$, $K_4$). In the event it is acceptable to use a somewhat more complicated multiplier, it is then possible to use all six possible combinations or partial signals. A radiation detector element S of the type shown in FIG. 1 can be particularly then advantageously employed where the radiation to be detected only has a small cross-section and, therefore, the receiver surface should be as small as conveniently possible.

Figure 2:
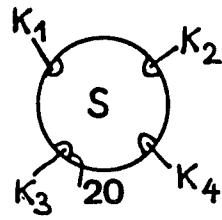

The shape of the radiation sensitive element need not however be square. Thus, for instance, in FIG. 2 there is shown an embodiment of a radiation sensitive element in the form of a round, substantially circular-shaped detector element S, at the circumferential edge of which there are provided the four metallic contact surfaces 20 providing the contacts or connections $K_1$, $K_2$, $K_3$ and $K_4$.

Figure 3:
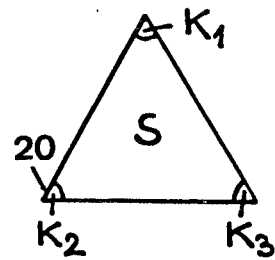

Now in FIG. 3 there is shown a triangular detector element S having a respective contact or connection $K_1$, $K_2$ and $K_3$ at the three corners and formed by the contact surfaces 20. For evaluation purposes it is therefore possible to use, for instance, the partial signals $T_1$ ($K_1$, $K_3$) and $T_2$ ($K_2$, $K_3$).

Figure 4:
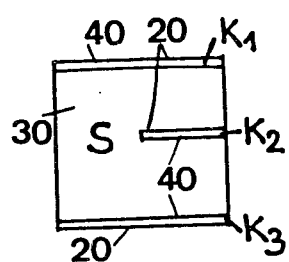

FIG. 4 shows a still further possible arrangement of three contact surfaces 20 in the form of contact strips 40 forming the contacts or connections $K_1$, $K_2$, $K_3$ at a quadratic or square plate 30 radiation sensitive detector element S. In this case two of the contacts $K_1$ and $K_3$ are arranged at both edges or sides of the plate 30 of the detector element S, whereas the contact $K_2$ constitutes a central contact strip 40 protruding into the surface of the plate 30. In this case there can be used for evaluation purposes as the partial signals, for instance the signals $T_1$ ($K_1$, $K_2$) and $T_2$ ($K_2$, $K_3$).

Figure 5:
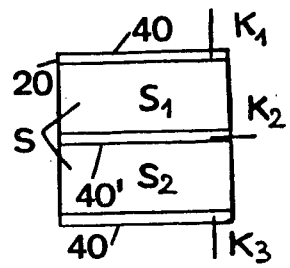

Also as shown in the variant embodiment of FIG. 5, the intermediate contact strip 40' can be designed as a continuous strip, so that there are formed at the same radiation sensitive material two separate radiation sensitive surfaces $S_1$ and $S_2$ for the detector element S. Depending upon the length or size of the intermediate or central contact or contact strip 40 there is a different dependency of the output signals and noise signals upon one another.

Figure 6:
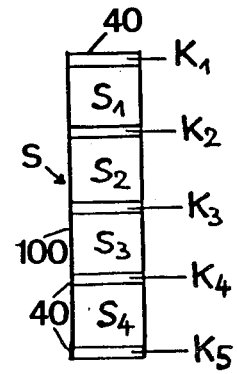

Continuing, with the arrangement shown in FIG. 6 there are disposed upon a strip-shaped, radiation sensitive surface 100 constituting the detector element S a number of contacts $K_1$, $K_2$, $K_3$, $K_4$ and $K_5$ in the form of parallel contact strips 40. Here there can be employed as the partial signals each time the signals between two neighboring contacts, i.e. $T_1$ ($K_1$, $K_2$), $T_2$ ($K_2$, $K_3$), $T_3$ ($K_3$, $K_4$) and $T_4$ ($K_4$, $K_5$). With such arrangement the radiation sensitive element or detector element S can consist of a continuous radiation sensitive layer at which there are mounted at a certain mutual spacing and in parallelism to one another the individual contact strips 40, or such radiation sensitive element can consist of individual radiation sensitive components or parts $S_1$, $S_2$, $S_3$ and $S_4$ formed of the same material which are separated from one another by the metallic strips 40 constituting the contacts $K_2$, $K_3$ and $K_4$.

Figure 7:
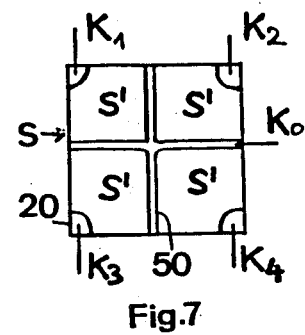

With the arrangement of FIG. 7, just as was the case for the arrangement of FIG. 1, there are provided at the corners of a quadratic or square radiation sensitive element S the contact surfaces 20 constituting the contacts or connections $K_1$, $K_2$, $K_3$ and $K_4$. Additionally, the radiation sensitive element or detector element S is divided into four sectors S' by the crosswise contact strip 50 defining contact $K_0$. In this case it is advantageous to use as the partial signals the signals $T_1$ ($K_0$, $K_1$), $T_2$ ($K_0$, $K_2$), $T_3$ ($K_0$, $K_3$) and $T_4$ ($K_0$, $K_4$).

Figure 8:
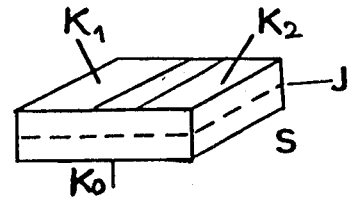
FIG. 8 is a schematic perspective view of a possible arrangement of the contacts at a body-like detector element.

FIG. 8 illustrates an example of a possible arrangement of the contacts or connections at a detector element S in the form of a body-like member, for instance constituting a blocking layer detector or a pyroelectric detector. It is advantageous to arrange a common base contact defining the contact $K_0$ at the underside of the detector element S and a number of contacts $K_1$, $K_2$ at the top side or face. The blocking layer J of the detector element S, in this case, is arranged between the bottom side and top side of the element body. As the partial signals it is therefore advantageous to use $T_1$ ($K_0$, $K_1$) and $T_2$ ($K_0$, $K_2$).

It is here remarked that in any event also other arrangements of connections or contacts can be provided upon or at radiation detector elements and there can be selected a random number of contacts as long as there can be removed at least two signals emanating from non-identical contacts or connections.

FIG. 9 shows a block circuit diagram of a radiation detector constructed according to the invention. It is to be understood that the radiation detector element S which, for instance, can be constructed according to any of the embodiments shown in FIGS. 1 to 4, delivers a number of partial signals $T_1, T_2, \ldots T_n$, which may be first amplified at the amplifiers $A_1, A_2 \ldots A_n$, to a multiplier device or multiplier M, at the output 60 of which there appears the product $A = T_1 \cdot T_2 \cdot \ldots \cdot T_n$, which is delivered to a subsequently connected not particularly illustrated evaluation device, which in the presence of certain criteria, delivers a signal. Although the invention is not concerned with a specific construction of evaluation device, since different prior art evaluation circuits can be used, one such type of possible evaluation device has been disclosed in my commonly assigned, copending U.S. application Ser. No. 817,916, filed July 22, 1977, entitled "Infrared Intrusion Detector Circuit", to which reference may be readily had and the disclosure of which is incorporated herein by reference.

Figure 10:
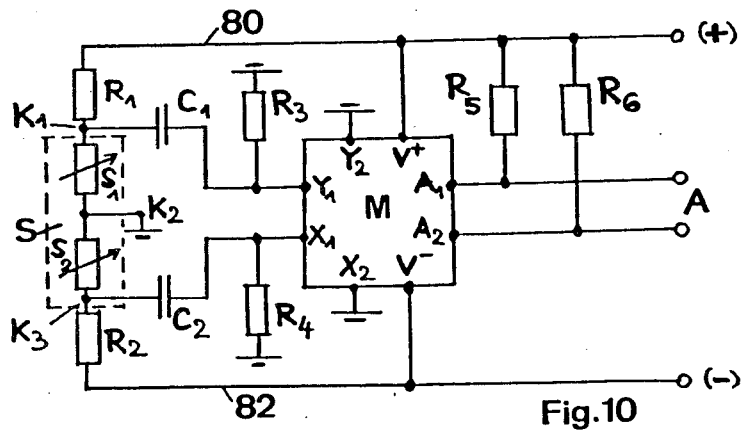
FIG. 10 illustrates an example of circuitry of a radiation detector constructed according to the invention.

FIG. 10 shows in detail a possible circuit wherein there is employed the radiation sensitive element or detector element S illustrated in FIGS. 4 or 5 having the contacts or connections $K_1$, $K_2$ and $K_3$ as well as the radiation sensitive surfaces or components $S_1$ and $S_2$. Both of these radiation sensitive parts or components $S_1$ and $S_2$, defining respective resistance paths, are connected by means of the resistors $R_1$ and $R_2$ between two lines or conductors 80 and 82 to which there is applied at the contacts $K_1$ and $K_2$ the positive (+) and negative (−) supply voltage, as shown, whereas the intermediate contact or connection $K_2$ is at null or ground potential. The signals appearing at the connections or contacts $K_1$ and $K_3$ are delivered by means of the capacitors $C_1$ and $C_2$ to the $Y_1$-input and $X_1$-input, respectively, of a multiplier circuit or multiplier M. A possible multiplier M which can be beneficially employed for the practice of the invention is commercially obtainable, for instance, in the form of an integrated circuit from Motorola Company under its commercial designation Type MC 1595, but of course another suitable or equivalent multiplier can be used. The $X_2$-input and $Y_2$-input of the multiplier M are at null or ground potential, in other words at the same potential as the center tap or contact $K_2$, so that at the output of the multiplier M there appears the output signal $A=(Y_1-Y_2)\cdot(X_1-X_2)=T_1\cdot T_2$. This output signal A is equal to null as long as no signal is delivered by one of the capacitors $C_1$ and $C_2$. The output signal A only then differs from null when there are simultaneously delivered signals to the inputs $Y_1$ and $X_1$, i.e., when both partial voltages $T_1(K_1, K_2)$ and $T_2(K_2, K_3)$ are simultaneously different from null. It is here further remarked that is is advantageous to stabilize the input $X_1$ and $Y_1$ as well as the outputs $A_1$ and $A_2$ of the multiplier M by suitable resistors $R_3$, $R_4$, $R_5$ and $R_6$, as shown. Typical exemplary values for the resistors and capacitors of the circuitry of FIG. 10 are the following:

$R_1$ = 100 kohms
$R_2$ = 100 kohms
$R_3$ = 500 kohms
$R_4$ = 500 kohms
$R_5$ = 10 kohms
$R_6$ = 10 kohms
$C_1$ = 1 μf
$C_2$ = 1 μf It is here also mentioned that multiplication of the partial signals can be basically accomplished in random fashion. Circuits suitable for this purpose are known in large numbers as multiplier circuits, non-linear amplifiers, modulators or product detectors. Under such equipment for the multiplication of signals there is to be understood, in the sense of the invention, also those circuits wherein there does not occur any pure multiplication, but the output signal at least partially contains a logic multiple of the input signal. Thus, for instance, the partial signals can be processed by logarithmic or partially or approximately logarithmic or limiting amplifiers, the output signals of which are then added. The output signal is then logarithmic or approximately the logarithm of the product. The circuit which has been herein designated in the sense of the invention as a multiplier device can however have as the output signal also another mathematical function of the product or a function with equivalent characteristics, wherein the value of the output signal increases when the value of a random input signal increases, and which disappears when one of the input signals is null. The wide range of the input signals, wherein the multiplier delivers an unambiguous output signal as a function of the product of the input signals, thus can be limited or defined both by an upper threshold as well as also towards a lower threshold, something which is the case anyway for commercially available multipliers. Also, the number of input signals is not limited to two input signals, as has been illustrated for the circuitry of FIG. 10, rather can be greater than two, corresponding to the number of contacts or connections which are available at the radiation sensitive element or detector element.

Radiation detectors of the type heretofore described, wherein detector elements are connected by more than two contacts or connections at any such type multiplier, are particularly suitable for use for the detection of the inherent radiation of an object, for instance the infrared radiation transmitted by an intruder, whose body radiation can be directed by means of suitable optical means at the radiation detector. The optical system can be constructed and arranged in the manner described for instance in the German petty patents Nos. 76 15724, 76 16715, 76 36763 or 76 36764, or as disclosed in any of the commonly assigned, U.S. Pat. No. 4,052,616, granted Oct. 4, 1977 or U.S. Pat. No. 4,058,726, granted Nov. 15, 1977, or commonly assigned, U.S. application Ser. No. 738,908, filed June 16, 1976, now U.S. Pat. No. 4,087,688, granted May 2, 1978, the disclosure of which is incorporated herein by reference, and wherein discrete receiving zones or directions are formed and during movement of the intruder the radiation impinging upon the radiation receiver is modulated. Another use is in the field of fire alarms wherein the flickering flame radiation of burning objects or the like can be received. In both cases there are eliminated in the described manner disturbances caused by noise signals, so that the sensitivity can be increased without any appreciable increase in equipment expenditure.

While there are shown and described present preferred embodiments of the invention, it is to be distinctly understood that the invention is not limited thereto, but may be otherwise variously embodied and practiced within the scope of the following claims. Accordingly,

What I claim is:

1. A radiation detector comprising:
   at least one radiation sensitive element for delivering an electrical signal in accordance with electromagnetic radiation impinging thereat;
   said radiation sensitive element having more than two electrical contacts;
   a multiplier device for multiplying at least two partial signals each appearing between two of the contacts; and
   said multiplier device delivering an output signal if both of said two partial signals are present at the same time and delivering no output signal if at least one of said partial signals is absent, in order to eliminate the effects of noise signals occurring between given pairs of said contacts.

2. The radiation detector as defined in claim 1, further including:
means for amplifying said partial signals.

3. The radiation detector as defined in claim 1, wherein:
said radiation sensitive element comprises a radiation sensitive surface having edge means at which are provided said contacts.

4. The radiation detector as defined in claim 3, wherein:
said radiation sensitive surface has a quadratic shape incorporating four corners; and
said contacts being arranged at said four corners and comprising metallic surfaces.

5. The radiation detector as defined in claim 3, wherein:
said radiation sensitive surface has a substantially circular configuration with a substantially circular edge; and
said contacts being provided at the region of said circular edge.

6. The radiation detector as defined in claim 3, wherein:
said radiation sensitive surface has a substantially triangular configuration incorporating three corners; and
said contacts being provided at said three corners.

7. The radiation detector as defined in claim 1, wherein:
said radiation sensitive element comprises a radiation sensitive surface carrying said contacts which are in the form of at least approximately parallel strips.

8. The radiation detector as defined in claim 7, wherein:
the partial signals are constituted by the signals appearing between neighboring contacts.

9. The radiation detector as defined in claim 1, wherein:
said radiation sensitive element comprises a radiation sensitive surface constituted by photoelectric semiconductor material of a photoresistor.

10. The radiation detector as defined in claim 1, wherein:
said radiation sensitive detector comprises a radiation sensitive surface constituting a thermistor.

11. The radiation detector as defined in claim 1, wherein:
said radiation sensitive element comprises a radiation sensitive body having a blocking layer; and
said contacts being arranged at both sides of the blocking layer at outer surfaces of the radiation sensitive element.

12. The radiation detector as defined in claim 1, wherein:
said radiation sensitive element comprises a pyroelectric body.

13. The radiation detector as defined in claim 1, wherein:
said multiplier device is structured for the multiplication of the partial signals such that at the multiplier output there appears a mathematical function of the product of the partial signals.

14. The radiation detector as defined in claim 1, wherein:
said multiplier device has an output and is structured such that the partial signals appear at said output in the form of the logarithm of the product of the partial signals.

15. The radiation detector as defined in claim 1, wherein:
the multiplier device has an output and is structured such that there is delivered at said output an output signal which is dependent upon the product of the input signals in an unambiguous manner when both input signals are between a lower threshold and an upper threshold.

16. A method of operating a radiation detector comprising at least one radiation sensitive element for delivering an electrical signal in accordance with electromagnetic radiation impinging thereat, said radiation sensitive element having more than two electrical contacts, and a multiplication device for multiplying at least two partial signals each appearing between two of the contacts, said multiplication device delivering an output signal if both of said two partial signals are present at the same time and delivering no output signal if at least one of said partial signals is absent, in order to eliminate the effects of noise signals occurring between given pairs of said contacts, including the steps of:
utilizing such radiation detector for detecting the inherent radiation of an object.

17. The method as defined in claim 16, further including the steps of:
utilizing the radiation detector for detecting the flame radiation of a burning object.

18. The method as defined in claim 16, wherein:
said radiation detector is employed for detecting the infrared body radiation of a human being.

19. The method as defined in claim 18, further including the steps of:
utilizing an optical system having discrete receiving regions for modulating the infrared body radiation during movement of the human being and delivering such modulated radiation to the radiation detector.

* * * * *